(12) United States Patent
Neilson (10) Patent No.: US 10,082,411 B2
(45) Date of Patent: Sep. 25, 2018

(54) PITOT TUBE STABILIZER ARRANGEMENT FOR CENTRIFUGAL PUMPS

(71) Applicant: Envirotech Pumpsystems, Inc., Salt Lake City, UT (US)

(72) Inventor: Bryce Neilson, Kaysville, UT (US)

(73) Assignee: Envirotech Pumpsystems, Inc., Salt Lake City, UT (US)

( * ) Notice: Subject to any disclaimer, the term of this patent is extended or adjusted under 35 U.S.C. 154(b) by 77 days.

(21) Appl. No.: 15/264,482

(22) Filed: Sep. 13, 2016

(65) Prior Publication Data

US 2017/0074696 A1    Mar. 16, 2017

Related U.S. Application Data

(60) Provisional application No. 62/218,471, filed on Sep. 14, 2015.

(51) Int. Cl.
| | | |
|---|---|---|
| *F04D 1/12* | (2006.01) | |
| *G01F 1/46* | (2006.01) | |
| *G01F 15/18* | (2006.01) | |

(52) U.S. Cl.
CPC ............... *G01F 1/46* (2013.01); *F04D 1/12* (2013.01); *G01F 15/185* (2013.01)

(58) Field of Classification Search
None
See application file for complete search history.

(56) References Cited

U.S. PATENT DOCUMENTS

| | | | |
|---|---|---|---|
| 3,822,102 A | 7/1974 | Erickson et al. | |
| 4,036,427 A * | 7/1977 | Erickson | B04B 1/00 |
| | | | 415/89 |
| 4,068,740 A * | 1/1978 | Quinn | F01M 9/10 |
| | | | 184/11.1 |
| 4,183,713 A | 1/1980 | Erickson et al. | |
| 4,264,269 A | 4/1981 | Erickson et al. | |
| 4,279,571 A | 7/1981 | Erickson | |
| 4,280,790 A | 7/1981 | Crichlow | |
| 5,975,840 A | 11/1999 | Angle et al. | |
| 6,431,828 B1 * | 8/2002 | Quinn | F04D 1/12 |
| | | | 415/89 |
| 9,719,516 B2 * | 8/2017 | Neilson | F04D 1/12 |
| 2003/0077165 A1 * | 4/2003 | Quinn | F04D 1/12 |
| | | | 415/89 |
| 2004/0219021 A1 | 11/2004 | Shaw | |
| 2014/0271127 A1 * | 9/2014 | Neilson | F04D 1/12 |
| | | | 415/89 |
| 2016/0017887 A1 * | 1/2016 | Neilson | F04D 1/12 |
| | | | 415/89 |
| 2017/0298939 A1 * | 10/2017 | Neilson | F04D 1/12 |

* cited by examiner

*Primary Examiner* — Harshad R Patel
(74) *Attorney, Agent, or Firm* — Morriss O'Bryant Compagni (57) ABSTRACT

A pitot tube assembly for a centrifugal pump includes an extension arm having a tubular body with opposing ends, at least one pickup tube secured to one of the opposing ends of the extension arm, a terminal portion positioned at the other end of the extension arm and a tapered fitting provided toward the end of the extension arm opposite to the end of the extension arm to which the pickup tube is secured, where the tapered fitting provides a frustum surface for registration with a frustoconically-shaped bore of a portion of the pump to provide axial, radial and torsional stability to the pitot tube assembly during pump operation.

20 Claims, 5 Drawing Sheets

PITOT TUBE STABILIZER ARRANGEMENT FOR CENTRIFUGAL PUMPS

CROSS REFERENCE TO RELATED APPLICATION

This is a non-provisional application which claims priority to U.S. provisional patent application No. 62/218,471, filed Sep. 14, 2015, the entire contents of which are incorporated herein in their entirety.

TECHNICAL

This disclosure relates in general to centrifugal pumps of the pitot tube type and, in particular, to a stabilizing arrangement for mitigating flexure and torsional movement of a pitot tube assembly, and for providing axial stability in a pitot tube assembly.

BACKGROUND OF THE DISCLOSURE

There are many types of centrifugal pumps that are used in various industries to pump clear and solids-entrained fluids. Centrifugal pumps of the pitot tube type are typically used in industries where a high velocity output of the fluids being processed is desired. High velocity fluid output is achieved by pitot tube pumps as a result of their unique structure.

Centrifugal pumps of the pitot tube type generally include a rotating assembly made of at least two portions, which form, in combination, a fluid chamber therein. The rotating assembly turns within a chamber that is formed by an outer pump casing. An inlet delivers fluid into the fluid chamber of the rotating assembly via channels that are positioned generally at a perpendicular angle to the rotational axis of the rotating assembly. Consequently, the velocity of the fluid increases as it enters the rotating assembly. Fluid delivered to the rotating assembly is then forced to the outer periphery of the fluid chamber by centrifugal forces.

A pitot tube assembly that generally comprises at least one pickup tube, or blade, is stationarily positioned within the fluid chamber of the rotating assembly. A pitot tube arm, or extension arm, extends from the pickup tube in the same direction as the rotational axis of the rotating assembly. The extension arm is formed with a channel, which directs fluid to a discharge outlet of the pump.

The pickup tube of a pitot tube assembly is positioned within the fluid chamber of the rotating assembly. The pickup tube has an inlet that is positioned near the periphery of the inner wall of the fluid chamber. Fluid at the periphery of the rotating fluid chamber encounters the stationary inlet of the pickup tube and is forced into a channel formed in the pickup tube. The pickup tube channel or fluid pathway of the pickup tube is positioned generally perpendicular to the rotational axis. The fluid pathway of the pickup tube is in fluid communication with a channel in the pitot tube arm, which delivers the fluid to the discharge outlet of the pump at high velocity.

The nature of the fluid flow in a pitot tube pump produces increasing velocity of the fluid as it enters the pump inlet, is directed to the fluid chamber of the rotating assembly, and as it moves through the pickup tube to the discharge outlet. The increased fluid velocities in the rotating assembly can result in thrust balancing issues in the rotating assembly, which have been addressed in the prior art. Examples of pump structures that address thrust balance issues in the rotating assembly are described in U.S. Pat. No. 3,822,102 to Erickson, et al.; U.S. Pat. No. 4,183,713 to Erickson, et al., and U.S. Pat. No. 4,279,571 to Erickson.

Increasing velocity of the fluid entering into and moving through the pitot tube assembly also affect the stationary nature of the pitot tube assembly. That is, axial loads are experienced along the longitudinal axis of the pitot tube arm, or extension arm. Radial, tangential and axial loads are also experienced in the pitot tube assembly due to fluid pressures. The existence and deleterious effects of the forces that affect the pitot tube assembly, and attempts to overcome them, are discussed in U.S. Pat. No. 5,975,840, the contents of which are incorporated herein by reference. In the '840 patent, the axial loads and forces that adversely affect the structure and operation of the pitot tube assembly are addressed by the use of strategically placed locking nuts that place the extension arm in tension.

Locking nuts for this purpose have proven to be effective in addressing resistance to moments and forces experienced in the pitot tube assembly. However, the effectiveness of resistance is dependent upon the strength of the locking nuts, and the locking nuts or fastener clamping strength can fail due to overstress or fatigue. Additionally, the use of such fasteners often requires precise high-torque tensioning or the use of a hydraulic tensioning device to properly install the fastener. Improper installation can lead to failure or early wear.

SUMMARY

In a first aspect of the disclosure, embodiments are disclosed of a pitot tube assembly for a centrifugal pump that comprises an extension arm having a tubular body with opposing ends and a central axis extending between the opposing ends, at least one pickup tube secured to one of the opposing ends of the extension arm, a terminal portion positioned at the end of the extension arm opposite the end of the extension arm to which the at least one pickup tube is secured, and a tapered fitting provided toward the end of the extension arm opposite the end of the extension arm to which the at least one pickup tube is secured, the tapered fitting being positioned between the opposing ends of the extension arm. This aspect of the disclosure has an advantage of providing a pitot tube assembly that can engage in tight compression with elements of a pump casing to mitigate axial, radial and torsional movement in the pitot tube assembly during operation of the pump.

In certain embodiments, the tapered fitting has an outer surface defining a frustum, the base plane of the frustum being oriented toward the end of the extension arm to which the at least one pickup tube is secured and the vertex plane of which is oriented toward the terminal portion of the extension arm.

In other certain embodiments, the outer surface of the tapered fitting defines an angle of from about two degrees to about twenty degrees, as measured between a plane extending along the surface of the frustum and a plane extending from the circumference of the base of the frustum parallel to the axis of the frustum and perpendicular to the plane of the base.

In some embodiments, the angle of the outer surface is from about two degrees to about eighteen degrees.

In other embodiments, the angle of the outer surface is from about four degrees to about sixteen degrees.

In still other embodiments, the angle of the outer surface is from about six degrees to about fourteen degrees.

In yet other embodiments, the angle of the outer surface is from about eight degrees to about twelve degrees.

In yet another embodiment, the terminal portion is formed, at least in part, to receive a tensioning mechanism in engagement with the terminal portion.

In other embodiments, the terminal portion is formed with a threaded surface for receiving a threaded tensioning mechanism in engagement therewith.

In still another embodiment, the terminal portion is structured with an annular channel sized to receive a sealing device therein.

In other embodiments, a keying mechanism is positioned at the terminal portion and in proximity to the tapered fitting, the keying mechanism being aligned with and along a plane extending along the central axis of the extension arm, which plane is coextensive with a plane in which a longitudinal axis of the at least one pickup tube lies.

In still other embodiments, the frustum is configured with an annulus adjacent the base of the frustum, the annulus being structured with a channel to receive a sealing device therein.

In certain embodiments, the at least one pickup tube comprises an arrangement of two or more blades extending away from each other blade of the arrangement.

In a second aspect, a centrifugal pump of the pitot tube type comprises an outer pump casing, a rotor assembly positioned within the pump casing, the rotor assembly further comprising a rotor having a fluid chamber formed therein, the rotor being engaged by a drive mechanism; a pitot tube assembly that includes an extension arm having a tubular body with opposing ends and a central axis extending between the opposing ends, at least one pickup tube secured to one of the opposing ends of the extension arm, the at least one pickup tube being positioned within the fluid chamber of the rotor, a terminal portion positioned at the end of the extension arm opposite the end of the extension arm to which the at least one pickup tube is secured, and a tapered fitting provided toward the end of the extension arm opposite the end of the extension arm to which the at least one pickup tube is secured, the tapered fitting being positioned between the opposing ends of the extension arm; a seal plate configured with a bore structured to receive the tapered fitting of the pitot tube assembly in registration therewith; and a discharge fitting secured to the seal plate. This aspect of the disclosure has the advantage of providing a centrifugal pump of the pitot tube type in which the pitot tube assembly is better stabilized to limit or overcome axial, radial and torsional forces that are imposed on the pitot tube assembly during operation of the pump.

In certain embodiments, the bore of the seal plate is frustoconically-shaped.

In some embodiments of this aspect, a tensioning mechanism is secured to the terminal portion of the extension arm.

In certain other embodiments, the terminal portion is structured with a thread, and the tensioning mechanism is a locking nut.

In yet other embodiments, the terminal portion is structured with a thread, and the tensioning mechanism is a multi-jack tensioner device.

In still other embodiments, the outer surface of the tapered fitting defines a frustum having an angle of from about two degrees to about twenty degrees, as measured between a plane extending along the surface of the frustum and a plane extending from the circumference of the base of the frustum parallel to the axis of the frustum and perpendicular to the plane of the base.

In some embodiments, the angle of the outer surface is suitably from about six degrees to about twelve degrees.

In other embodiments, a keying mechanism is positioned at the terminal end of the extension arm and in proximity to the tapered fitting, the keying mechanism being aligned with and positioned in a plane extending along the central axis of the extension arm, which plane is coextensive with a plane extending through a longitudinal axis of the at least one pickup tube.

In still other embodiments, the tapered fitting is configured with an annulus, the annulus being structured with a channel to receive a sealing device therein.

In certain embodiments, the sealing device is an o-ring.

In yet other embodiments, the terminal end is configured with an annulus being structured to receive a sealing mechanism in registration therewith.

In certain embodiments, the sealing mechanism is an o-ring.

In other embodiments, the at least one pickup tube comprises an arrangement of two or more blades, each blade extending away from each other blade of the arrangement.

In a third aspect, methods of fitting a pitot tube assembly in a centrifugal pump comprise providing a pump casing configured with a pump chamber therein for receiving a rotor; providing a rotor assembly including a rotor that is configured with a fluid chamber within and an inlet for introducing fluid into the fluid chamber of the rotor; providing a pitot tube assembly including an extension arm having a tubular body with opposing ends and a central axis extending between the opposing ends, at least one pickup tube secured to one of the opposing ends of the extension arm, a terminal portion positioned at the end of the extension arm opposite the end of the extension arm to which the at least one pickup tube is secured, and a tapered fitting provided toward the end of the extension arm opposite the end of the extension arm to which the at least one pickup tube is secured, the tapered fitting being positioned between the opposing ends of the extension arm; positioning the at least one pickup tube within the fluid chamber of the rotor assembly; positioning the extension arm of the pitot tube assembly to extend away from the rotor and to extend through the pump casing; positioning a seal plate, having a bore, about the terminal end of the extension arm to position the tapered fitting in registration with the frustoconically-shaped bore of the seal plate; securing the seal plate to the pump casing; and securing a discharge fitting to the seal plate.

In certain embodiments, the bore of the seal plate is frustoconically-shaped.

In some embodiments, the methods include attaching a tensioning mechanism to the terminal end of the extension arm to bring the tapered fitting into compression with the frustoconically-shaped bore of the seal plate, followed by securing the discharge fitting to the seal plate.

In a fourth aspect, a method for releasing a pitot tube assembly from a centrifugal pump comprises providing a centrifugal pump having: a rotor assembly with a rotor configured with a fluid chamber therein, a pitot tube assembly having at least one pickup tube positioned within the fluid chamber of the rotor, the pitot tube assembly having an extension arm secured to the at least one pickup tube and extending through the pump casing for engagement with a seal plate to secure the extension arm in relation to the pump casing and rotor, a tensioning mechanism engaged with an end of the extension arm opposite the end of the extension arm to which the at least one pickup tube is secured, and a discharge fitting secured to the seal plate; removing the discharge fitting from securement with the seal plate; partially releasing the tensioning mechanism from the end of the extension arm; and repositioning the discharge fitting in registration with the seal plate to release the extension arm of the pitot tube assembly from engagement with the seal plate. These methods provide an advantage over other methods of releasing a pitot tube assembly from engagement with a pump casing in facilitating the disengagement of friction fit surfaces.

In some embodiments, the extension arm is configured with a tapered fitting having an outer surface that defines a frustum, and the seal plate has a frustoconically-shaped bore configured to receive the frustum of the tapered fitting in registration therewith, the methods including placing the discharge fitting in registration with the seal plate following partial releasing of the tensioning mechanism to cause a disengagement of the frustum from the frustoconically-shaped bore.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
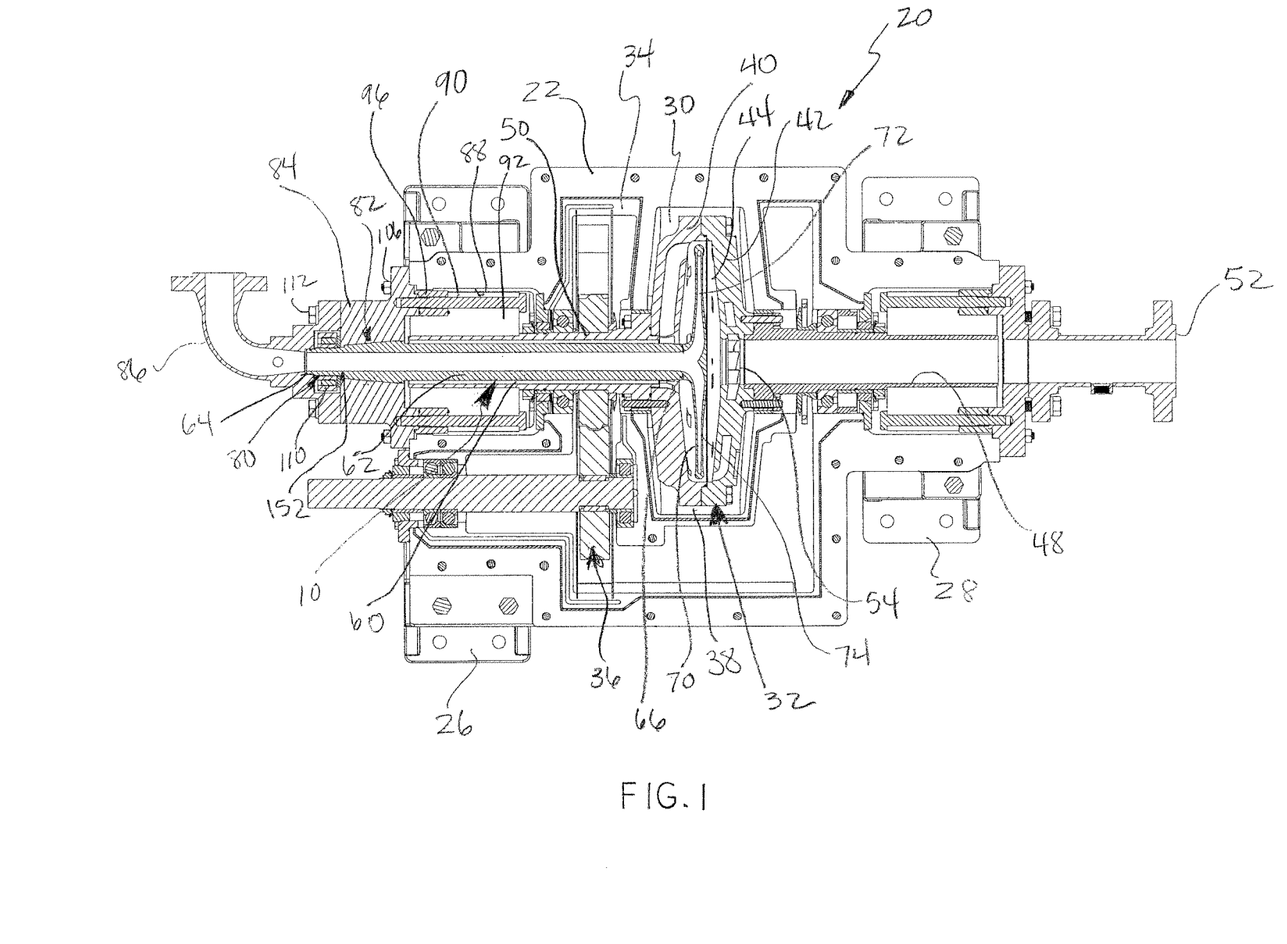
FIG. 1 is an elevation view in cross section of a centrifugal pump of the pitot tube type, depicting the arrangement of the disclosure.

FIG. 1 provides an illustration of a centrifugal pump of the pitot tube type for the purposes of understanding the general positioning and function of the pitot tube assembly 10 and pump arrangement of the disclosure. It should be noted that the illustrated centrifugal pump configuration is but one possible example of a centrifugal pump configuration. The construction and configuration of the pump may vary widely.

The centrifugal pump 20 of FIG. 1 illustrates that a centrifugal pump of the pitot tube type, also referred to herein as "a pitot tube pump," generally comprises an outer pump casing 22 which is typically supported on a pedestal arrangement, here shown as comprising spaced-apart legs 26, 28. The interior of the pump casing 22 in the illustrated construction is divided into a rotor chamber 30, in which a rotor assembly 32 is positioned, and a drive chamber 34, which houses a drive mechanism 36 for effecting rotation of the rotor assembly 32.

The rotor assembly 32 further comprises a rotor 38 that is comprised of a rotor bowl 40 and a rotor cover 42 that are secured together to form a fluid chamber 44. The rotor assembly 32 is journaled within the rotor chamber 30 by attachment to a fluid inlet conduit 48 and a drive sleeve 50 that is operatively connected to the drive mechanism 36. In operation of the pump 20, fluid is directed into the pump through an inlet fitting 52, which is in fluid communication with the fluid inlet conduit 48. From the fluid inlet conduit 48, fluid enters into a rotor inlet 54 formed in the rotor cover 42, and then into the fluid chamber 44 within the rotor 38.

Figure 3:
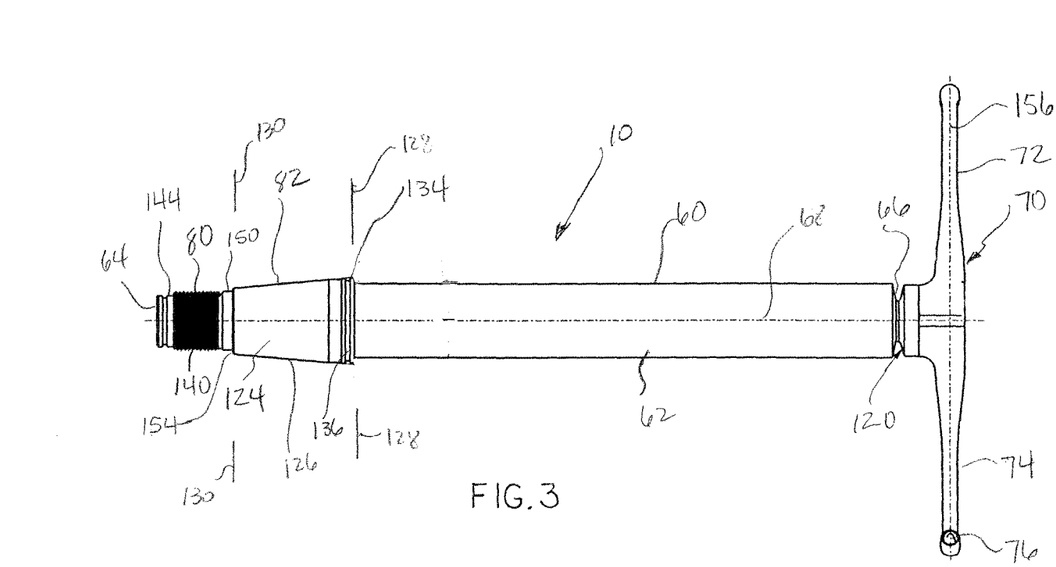
FIG. 3 is side view in elevation of a pitot tube assembly in accordance with the disclosure.
Figure 4:
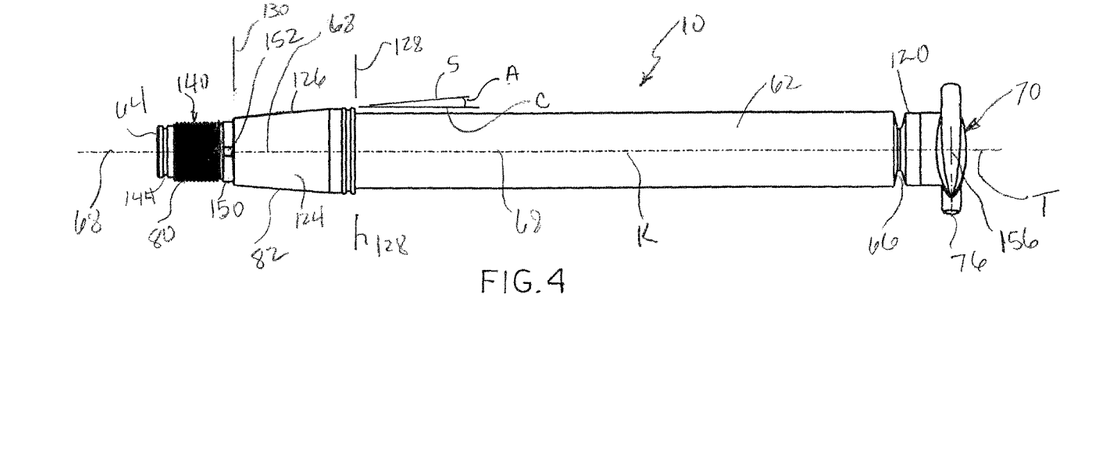
FIG. 4 is a side view in elevation of the pitot tube assembly illustrated in FIG. 3, turned 90° to the left or bottom of the paper.

The pump 20 further includes a pitot tube assembly 10 in accordance with the disclosure. The pitot tube assembly 10 includes an extension arm 60 having a tubular body 62 with opposing ends 64, 66 and a central axis 68 extending between the opposing ends 64, 66, as best depicted in FIGS. 3 and 4. In the illustrated pump configuration, the tubular body 62 of the extension arm 60 is positioned to extend through the drive sleeve 50.

The pitot tube assembly 10 further includes at least one pickup tube 70 that is secured to one end 66 of the opposing ends of the extension arm 60. The at least one pickup tube 70, also known in the art as a pitot tube, is positioned within the fluid chamber 44 of the rotor 38. In the figures herein, the at least one pickup tube 70, or pitot tube, is illustrated as having two blades 72, 74, each of which extends away from each other blade of the arrangement. As shown in FIGS. 1-4, the two blades 72, 74 of this arrangement are directed in diametric opposition to each other, but other arrangements are within the scope of this disclosure, including having a single blade. Each pickup tube 70 or blade has a pitot tube inlet 76 at a radially-disposed end of the pitot tube 70, the pitot tube inlet being positioned near the inner peripheral wall of the fluid chamber 44.

The pitot tube assembly 10 further includes a terminal portion 80 that is positioned at the end 64 of the extension arm 60 opposite the end 66 of the extension arm 60 to which the at least one pickup tube 70 is secured. A tapered fitting 82 is provided toward the end 64 of the extension arm 60 opposite to the end 66 of the extension arm 60 to which the at least one pickup tube 70 is secured, the tapered fitting 82 being positioned between the opposing ends 64, 66 of the extension arm 60. As described more fully hereinafter, the pump 20 includes a seal plate 84, that engages with the tapered fitting 82 of the pitot tube assembly 10 and is attached to the pump casing 22, and a discharge fitting 86 that is secured to the seal plate 84.

Figure 2:
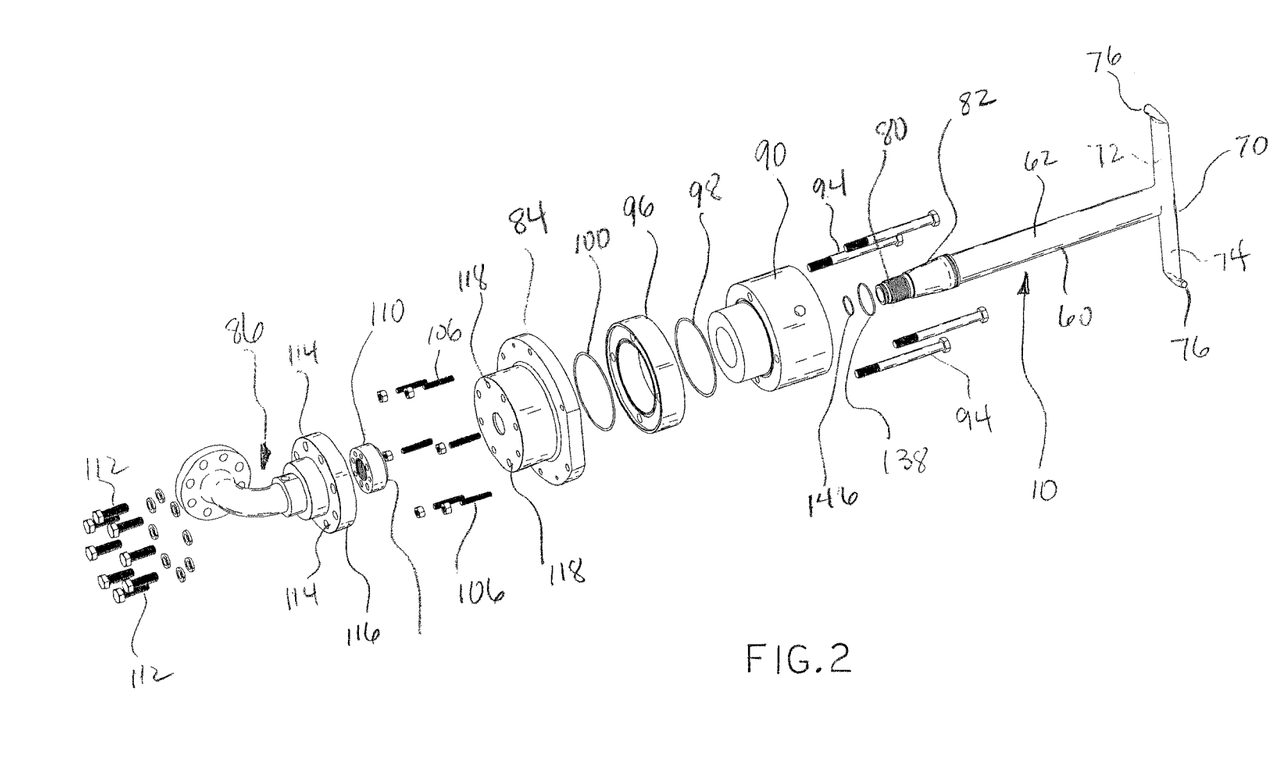
FIG. 2 is an exploded view of part of the pump shown in FIG. 2, depicting the positioning of the pitot tube assembly of the disclosure.

FIGS. 1 and 2 illustrate the assemblage of the pitot tube assembly 10 relative to the seal plate 84 and discharge fitting 86, and relative to surrounding structures of the pump 20. Specifically, in assemblage of the discharge end of the pump 20, the extension arm 60 of the pitot tube assembly 10 passes through the drive sleeve 50 and through a walled opening 88 in the pump casing 22. The walled opening 88 is sized in diameter to receive a seal assembly housing 90 that has an internal bore 92 through which the drive sleeve 50 and extension arm 60 pass. The seal assembly housing 90 is secured to the seal plate 84 by means such as bolts 94. A seal spacer 96 may optionally be positioned between the seal assembly housing 90 and the seal plate 84 to accommodate variances in sizes and types of seal assembly housings that may be used. A series of o-rings 98, 100 operate to seal the seal spacer 96 between the seal assembly housing 90 and seal plate 84.

Thus, in assemblage, the seal assembly housing 90, which is secured to the seal spacer 96 and seal plate 84, is received in the walled opening 88 of the pump casing 22 and about the drive sleeve 50. Concurrently, the tapered fitting 82 of the pitot tube assembly 10 is received in a frustoconically-shaped bore 104 of the seal plate 84. The seal plate 84 is then secured to the pump casing 22 by use of such means as bolts 106. A tensioning mechanism 110 may be secured to the terminal portion 80 of the pitot tube assembly 10, as described more fully hereinafter. The discharge fitting 86 is then secured to the seal plate 84 by means such as bolts 112, which are received through openings 114 formed in a flange 116 of the discharge fitting 86 and through aligned openings 118 in the seal plate 84.

FIGS. 3 and 4 provide a more detailed view of the pitot tube assembly 10 of the disclosure, illustrating that the pitot tube assembly includes an extension arm 60 having a tubular body 62 with opposing ends 64,66 and a central axis 68 extending between the opposing ends 64, 66, at least one pickup tube 70 secured to one end 66 of the opposing ends of the extension arm 60, a terminal portion 80 positioned at the end 64 of the extension arm 60 opposite the end 66 of the extension arm 60 to which the at least one pickup tube 70 is secured, and a tapered fitting 82 provided toward the end 64 of the extension arm 60 opposite to the end 66 of the extension arm 60 to which the at least one pickup tube 70 is secured, the tapered fitting 82 being positioned between the opposing ends 64, 66 of the extension arm 60.

As previously described, the at least one pickup tube 70 may comprise a single pickup tube or blade 74, or may constitute a plurality of blades 74 (e.g., two, three four or more blades). As shown, one possible arrangement is two blades 72, 74 which are in diametric opposition to each other. Other arrangements are possible. The pickup tubes or blades 72, 74 are typically cast and have a common base portion 120 which is configured for securement to one end 66 of the extension arm 60. The at least one pickup tube 70, at its base portion 120, may be secured to the extension arm 60 by any suitable means, such as welding.

At the other end 64 of the extension arm 60, the tapered fitting 82 has an outer surface 124 which defines a frustum 126, the base plane 128 of the frustum 126 being oriented toward the end 66 of the extension arm 60 to which the at least one pickup tube 70 is secured, and the vertex plane 130 of the frustum 126 being oriented toward the terminal portion 80 or end 64 of the extension arm 60 opposite the at least one pickup tube 70.

The outer surface 124 of the tapered fitting 82 defines an angle A (FIG. 4) that is from about two degrees to about twenty degrees, as measured between a plane S extending along the outer surface 124 of the frustum 126 and a plane C extending from the circumference of the base of the frustum 126 parallel to the central axis 68 of the frustum 126 and perpendicular to the base plane 128 of the frustum 126. A particularly suitable angle is from about eight degrees to about twelve degrees. The angle A may also be from about four degrees to sixteen degrees, or from about six degrees to about fourteen degrees, or from about nine degrees to about fifteen degrees.

Figure 5:
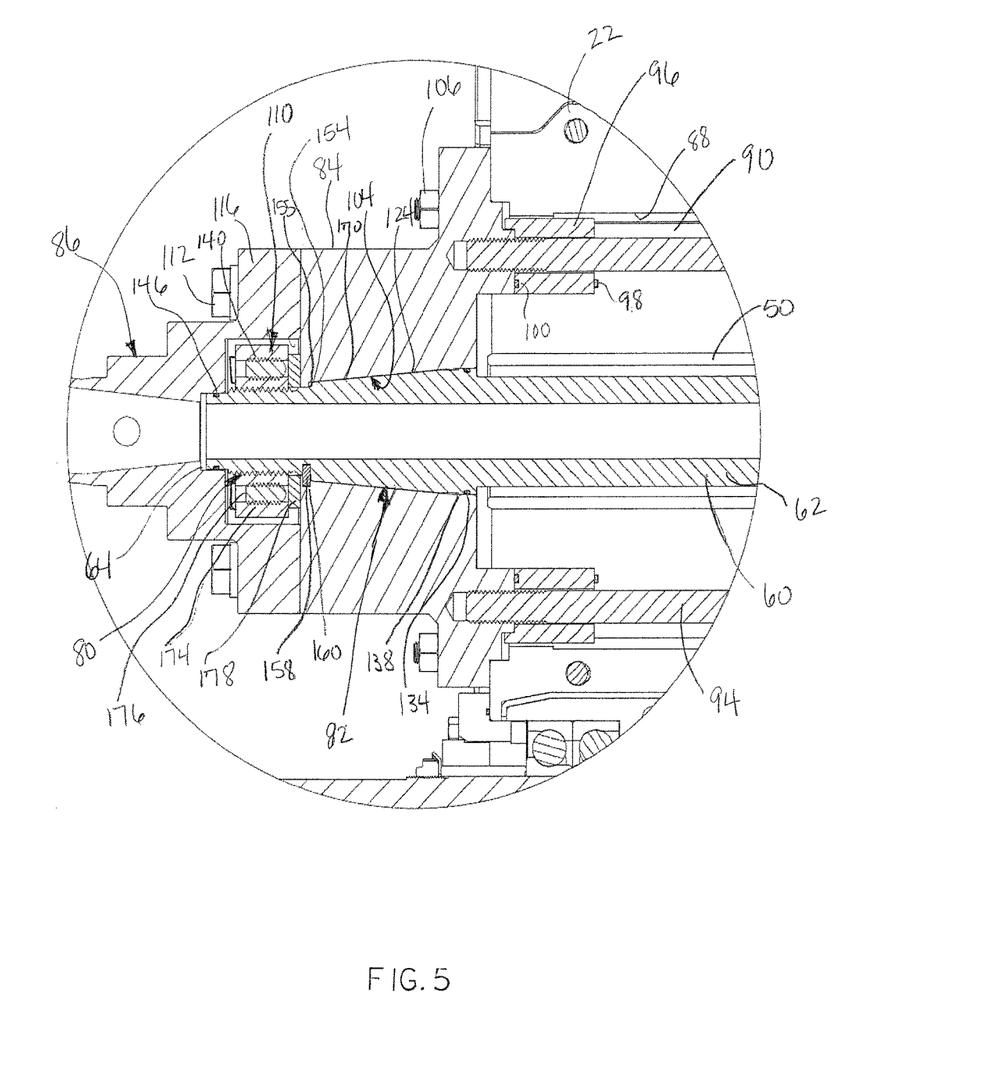
FIG. 5 is an enlarged view of a taper arrangement of the pitot tube assembly in accordance with the disclosure.

The frustum 126 may suitably be configured with an annulus 134 adjacent the base plane 128 of the frustum 126, the annulus being structured with a channel 136 to receive a sealing device therein, such as an o-ring 138 (FIGS. 1, 2 and FIG. 5). The terminal portion 80 of the pitot tube assembly 10 is configured to provide means for optionally receiving a tensioning mechanism to facilitate the compression of the outer surface 124 of the tapered fitting 82 in registration with the frustoconically-shaped bore 104 of the seal plate 84. In one embodiment, the terminal portion 80 is formed, at least in part, with a thread 140 for receiving a threaded tensioning mechanism 110 in engagement with the terminal portion 80.

An annular channel 144 is suitably formed at the end 64 of the extension arm 60 to receive a sealing device, such as an o-ring 146 (FIGS. 1, 2 and 5). The sealing device, or o-ring 146, provides a fluid seal between the end 64 of the extension arm 60 and the discharge fitting 86.

A transition portion 150 is suitably provided on the extension arm 60 between the tapered fitting 82 and the terminal portion 80. The transition portion 150 is generally formed by configuring the frustum 126 with an inwardly extending shoulder 154 that aids in preventing the tapered fitting 82 from bottoming out in the frustoconically-shaped bore 104, which is complementarily configured with a ledge 155 against which the shoulder 154 rests. The transition portion 150 provides a land of constant diameter. The transition portion 150 provides for placement of a keying mechanism 152 that is positioned at the terminal portion 80 and in proximity to the tapered fitting 82. The keying mechanism 152 is aligned with and along a plane K (FIG. 4) that extends along the central axis 68 of the extension arm 60, plane K being coextensive with a plane T in which a longitudinal axis 156 of the at least one pickup tube 70 lies. The keying mechanism 152 may be any suitable device, comprising for example, a spline 158, that engages with an opening 160 formed in the seal plate 84 (FIG. 5).

The keying mechanism 152 assures that, during assembly, the pitot tube assembly 10 is installed so that the blade or blades of the at least one pickup tube 70 is/are positioned within the fluid chamber 44 of the rotor 38 is a vertical orientation. To that end, it should be noted that in FIG. 1, the pitot tube assembly 10 is oriented to show the general placement of the keying mechanism 152 relative to the seal plate 84, but in an actual assemblage, the blades of the at least one pick up tube 70 would be oriented 90 degrees from the position that is shown in FIG. 1.

Figure 6:
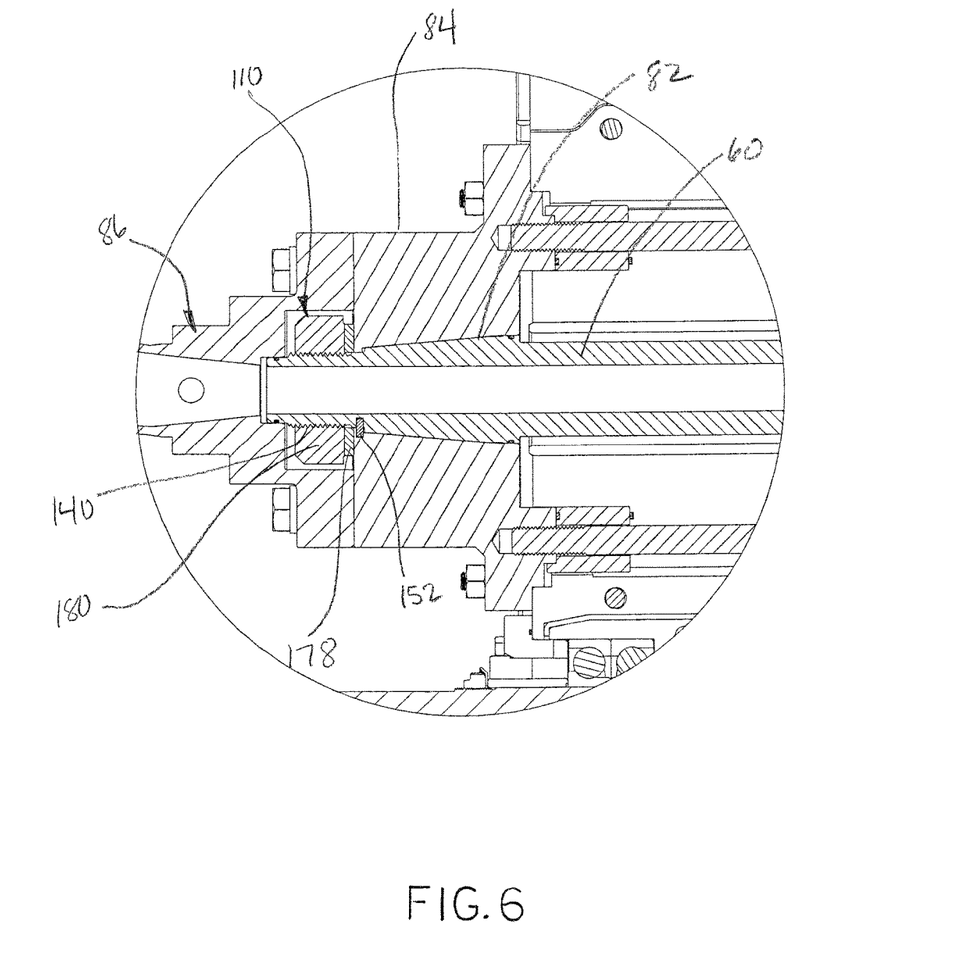
FIG. 6 is an enlarged view of an alternative embodiment of the pitot tube assembly in accordance with the disclosure.

FIGS. 5 and 6 provide enlarged views of the end 64 of the extension arm 60 at the discharge end of the pump 20 to better illustrate and describe the operation of the tapered fitting 82 relative to the seal plate 84. In FIG. 5, it can be seen that the tapered fitting 82 of the pitot tube assembly 10, the outer surface 124 of which defines a frustum 126, is configured to be received in the frustoconically-shaped bore 104 of the seal plate in friction fit therewith. The interfitting of the outer surface 124 of the frustum 126 with the inner surface 170 of the frustoconically-shaped bore 104 by friction fit operates to mitigate or prevent torsional movement of the extension arm 60 and pitot tube assembly, and to mitigate axial and radial movement of the pitot tube assembly.

When the angle A (FIG. 4) of the outer surface 124 is more shallow, such as in the lower range of about two degrees to about ten degrees, the friction fit between the outer surface 124 and the inner surface 170 of the frustoconically-shaped bore 104 is sufficient to effect a tensioning engagement between the two surfaces and to keep the tapered fitting in compression with the seal plate 84. In such instances, the use of a tensioning mechanism 110 is unnecessary, but may be used nonetheless.

When the angle A of the outer surface 124 is greater, such as in the upper range of about ten degrees to about twenty degrees, the friction fit between the outer surface 124 of the tapered fitting 84 and the inner surface 170 of the frustoconically-shaped bore 104 is enhanced by employment of a tensioning mechanism 110 placed in engagement with the terminal portion 80 of the extension arm 60. The tensioning mechanism can be any device that exerts an axial force on the extension arm 60 in the direction of the discharge fitting 86, which increases the frictional forces between the tapered fitting 82 and the inner surface 170 of the frustoconically-shaped bore 104. These forces, in conjunction with the large surface areas of the frustum 126 and the inner surface 170, resist movement of the extension arm 60 in a radial and torsional direction.

In one exemplar embodiment, the tensioning mechanism 110 may be a multi-jack tensioner device 174 that is threadingly received on the thread 140 of the terminal portion. In a multi-jack tensioning device 174, a plurality of tensioning screws 176 are provided to adjust the amount of tension applied by the device 174. In this embodiment, a hardened washer 178 is positioned between the multi-jack tensioner device 174 and the seal plate 84 to provide distribution of the force applied by the plurality of tensioning screws 176.

FIG. 6 illustrates an alternative embodiment of a tensioning mechanism 110 in which a conventional locking nut 180 is threaded onto the thread 140 of the terminal portion 80. A conventional locking nut 180 provides adequate tension on the tapered fitting 84 and extension arm 60. A hardened washer 178 is also used in this embodiment, and is positioned between the conventional locking nut 180 and seal plate 84 to distribute the tensioning forces applied by the conventional locking nut 180. The configuration of the tapered fitting 82 of the present disclosure provides an advantage over conventional configurations for securing a pitot tube assembly to the pump in that wear on the tensioning mechanism 110, including a conventional locking nut, is lessened, thereby enabling the reuse of the tensioning mechanism 110 when refurbishing the pump, which is typically not the case in conventional pump configurations where the wear on the locking nut is substantial and usually prevents reuse of the locking nut. Additionally, the tapered fitting of the disclosure is more fatigue-resistant than conventional configurations that use bolts, which are prone to damage from fatigue.

FIG. 5 helps illustrates a further advantage realized in the configuration of the disclosure. That is, a method for releasing a pitot tube assembly from a centrifugal pump comprises providing a centrifugal pump 20, as previously described, having a rotor assembly 32 with a rotor 38 configured with a fluid chamber 44 therein, a pitot tube assembly 10 having at least one pickup tube 70 positioned within the fluid chamber 44 of the rotor 38 and having an extension arm 60 secured to the at least one pickup tube 70, where the extension arm 60 extends through the pump casing 22 for engagement with a seal plate 84 to secure the extension arm 60 in relation to the pump casing 22 and rotor 38, a tensioning mechanism 110 being engaged with an end 64 of the extension arm 60 opposite the end 66 of the extension arm 60 to which the at least one pickup tube 70 is secured, and a discharge fitting 86 secured to the seal plate 84. The extension arm 60 can be released from engagement with the seal plate 84 by removing the discharge fitting 86 from securement with the seal plate 84 by loosening of the bolts 112 connecting them together, partially releasing the tensioning mechanism 110 from the end 64 of the extension arm 60 and repositioning the discharge fitting 86 in registration with the seal plate 84 to thereby release the extension arm 60 of the pitot tube assembly 10 from engagement with the seal plate 84.

The described method of releasing the pitot tube assembly 10 from the seal plate 84 is particularly useful in the pitot tube assembly of the disclosure because a strong friction fit is achieved between the outer surface 124 of the tapered fitting 82 and the inner surface 170 of the frustoconically-shaped bore 104 of the seal plate 84, which encumbers separation of the tapered fitting 82 from the frustoconically-shaped bore 104. The use of a tensioning mechanism 110 removably secured to the terminal portion 80 of the extension arm 60 allows the force of the discharge fitting 86 against the tensioning mechanism 110, when the tensioning mechanism 110 has been backed off slightly from full engagement with the terminal portion 80, to apply an axial force against the end 64 of the extension arm 60 in a direction away from the discharge fitting 86, which causes a release of the outer surface 124 of the tapered fitting 82 from the inner surface 170 of the frustoconically-shaped bore 104.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, inventions have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A pitot tube assembly for a centrifugal pump, comprising:
   an extension arm having a tubular body with opposing ends and a central axis extending between the opposing ends;
   at least one pickup tube secured to one of said opposing ends of said extension arm;
   a terminal portion positioned at the end of the extension arm opposite the end of the extension arm to which the at least one pickup tube is secured; and
   a tapered fitting provided toward the end of the extension arm opposite to the end of the extension arm to which the at least one pickup tube is secured, the tapered fitting being positioned between the opposing ends of the extension arm and having an outer surface oriented to register against a pump casing part in friction fit therewith.

2. The pitot tube assembly of claim 1, wherein the outer surface of the tapered fitting defines a frustum, the base plane of the frustum being oriented toward the end of the extension arm to which the at least one pickup tube is secured and the vertex plane of which is oriented toward the terminal portion of the extension arm.

3. The pitot tube assembly of claim 2, wherein the outer surface of the tapered fitting defines an angle of from about two degrees to about twenty degrees as measured between a plane extending along the surface of the frustum and a plane extending from the circumference of the base of the frustum parallel to the axis of the frustum and perpendicular to the plane of the base.

4. The pitot tube assembly of claim 2, wherein said frustum is configured with an annulus adjacent the base of the frustum, the annulus being structured with a channel to receive a sealing device therein.

5. The pitot tube assembly of claim 1, wherein the terminal portion is formed, at least in part, for receiving a tensioning mechanism in engagement with the terminal portion.

6. The pitot tube assembly of claim 5, wherein the tensioning mechanism is formed with a threaded surface and the terminal portion is formed with a threaded surface for receiving the threaded tensioning mechanism in engagement therewith.

7. The pitot tube assembly of claim 1, wherein the terminal portion is structured with an annular channel sized to receive a sealing device therein.

8. The pitot tube assembly of claim 1, further comprising a keying mechanism positioned at the terminal portion and in proximity to the tapered fitting, the keying mechanism being aligned with and along a plane extending along the central axis of the extension arm, which plane is coextensive with a plane in which a longitudinal axis of the at least one pickup tube lies.

9. A centrifugal pump of the pitot tube type, comprising:
   an outer pump casing;
   a rotor assembly positioned within said pump casing, said rotor assembly further comprising a rotor having a fluid chamber formed therein, the rotor being engaged by a drive mechanism;
   a pitot tube assembly comprising,
      an extension arm having a tubular body with opposing ends and a central axis extending between the opposing ends;
      at least one pickup tube secured to one of said opposing ends of said extension arm, the at least one pickup tube being positioned within the fluid chamber of said rotor;
      a terminal portion positioned at the end of the extension arm opposite the end of the extension arm to which the at least one pickup tube is secured; and
      a tapered fitting provided toward the end of the extension arm opposite to the end of the extension arm to which the at least one pickup tube is secured, the tapered fitting being positioned between the opposing ends of the extension arm;
   a seal plate configured with a bore structured to receive said tapered fitting of said pitot tube assembly in registration therewith; and
   a discharge fitting secured to said seal plate.

10. The centrifugal pump of claim 9, wherein the bore of the seal plate is frustoconically-shaped.

11. The centrifugal pump of claim 9, further comprising a tensioning mechanism secured to said terminal portion of said extension arm.

12. The centrifugal pump of claim 11, wherein said terminal portion is structured with a thread, and further wherein said tensioning mechanism is a locking nut.

13. The centrifugal pump of claim 11, wherein said terminal portion is structured with a thread, and further wherein said tensioning mechanism is a multi-jack tensioner device.

14. The centrifugal pump of claim 9, wherein an outer surface of the tapered fitting defines a frustum having an angle of from about two degrees to about twenty degrees as measured between a plane extending along the surface of the frustum and a plane extending from the circumference of the base of the frustum parallel to the axis of the frustum and perpendicular to the plane of the base.

15. The centrifugal pump of claim 9, further comprising a keying mechanism positioned at the terminal end of the extension arm and in proximity to the tapered fitting, the keying mechanism being aligned with and along a plane extending along the central axis of the extension arm, which plane is coextensive with a plane extending through a longitudinal axis of the at least one pickup tube.

16. The centrifugal pump of claim 9, wherein said tapered fitting is configured with an annulus, the annulus being structured with a channel to receive a sealing device therein.

17. The centrifugal pump of claim 9, wherein said terminal end is configured with an annulus being structured to receive a sealing mechanism in registration therewith.

18. A method of fitting a pitot tube assembly in a centrifugal pump, comprising:
   providing a pump casing configured with a pump chamber therein for receiving a rotor;
   providing a rotor assembly comprising a rotor that is configured with a fluid chamber within and an inlet for introducing fluid into the fluid chamber of the rotor;
   providing a pitot tube assembly comprising an extension arm having a tubular body with opposing ends and a central axis extending between the opposing ends, at least one pickup tube secured to one of said opposing ends of said extension arm, a terminal portion positioned at the end of the extension arm opposite the end of the extension arm to which the at least one pickup tube is secured, and a tapered fitting provided toward the end of the extension arm opposite to the end of the extension arm to which the at least one pickup tube is secured, the tapered fitting being positioned between the opposing ends of the extension arm and having an outer surface oriented to register against and in friction fit with a seal plate of the centrifugal pump;
   positioning said at least one pickup tube within said fluid chamber of said rotor assembly;
   positioning said extension arm of said pitot tube assembly to extend away from said rotor and to extend through said pump casing;
   positioning a seal plate, having a bore, about the terminal portion of said extension arm to position said tapered fitting in registration with said bore of said seal plate;
   securing said seal plate to said pump casing; and
   securing a discharge fitting to said seal plate.

19. The method of claim 18, wherein said bore of said seal plate is frustoconically-shaped.

20. The method of claim 18, further comprising attaching a tensioning mechanism to said terminal portion of said extension arm to bring said tapered fitting into compression with said frustoconically-shaped bore of said seal plate, followed by securing said discharge fitting to said seal plate.

* * * * *